2,704,773
Patented Mar. 22, 1955

United States Patent Office

2,704,773

HYDROGENATED DERIVATIVES OF PHENYL-p-BENZOQUINONE

De Walt S. Young and George F. Rodgers, Kingsport, Tenn., assignors to Eastman Kodak Company, Rochester, N. Y., a corporation of New Jersey No Drawing. Application May 5, 1951,
Serial No. 224,821

6 Claims. (Cl. 260—620)

This invention relates to an improved process for preparing phenyl hydroquinone by the hydrogenation of phenyl-p-benzoquinone. This invention also covers esters and ethers of phenyl hydroquinone which are, inter alia, useful as insecticides, fungicides, dye intermediates, high boiling solvents, plasticizers for synthetic resins, etc. Phenyl hydroquinone may be used as an intermediate in organic synthesis, as an antioxidant for hydrocarbons, synthetic resins, fats, oils, rubber, etc., it may have some useful biological activity as a mild anesthetic, etc.

The hydrogenation of p-benzoquinone and some derivatives thereof is not novel. Such processes as are known to the art involve a wide variety of procedures whereby many different results have been obtained. As a consequence, it is very difficult, if not impossible in some instances, to predict precisely what results will be obtained by the following of any given procedure. Thus, prior to our invention, it could not be predicted with any degree of certainty what products would be obtained by the hydrogenation of phenyl-p-benzoquinone. Since phenyl-p-benzoquinone is a dioxo derivative of diphenyl, it might appear upon first glance that hydrogenation of this compound would result in the hydrogenation of the carbon atoms in the unsubstituted benzene ring prior to the hydrogenation of the carbon atoms in the benzene ring containing the oxo atoms. However, our investigations into the chemical phenomena involved in such hydrogenation has revealed that the initial hydrogenation takes place on the dioxo substituted ring. Furthermore, additional investigation by DeWalt S. Young has revealed that by properly controlling the temperatures in particular, all of the unsaturated bonds in the dioxo substituted ring can be reduced by the addition of hydrogen so as to produce phenyl quinitol; moreover, phenyl quinitol can then be hydrogenated still further so as to result in the preparation of cyclohexyl quinitol by the proper control of temperatures employed. This latter subject matter is covered in a copending application by DeWalt S. Young, Serial No. 224,822 filed on even date herewith (May 5, 1951).

As exemplary of some of the prior art processes for reducing or hydrogenating benzoquinone derivatives, zinc dust and glacial acetic acid have been employed in the reduction of duroquinone, cf. Nef, Annalen der Chemie, vol. 237, p. 6. Similarly, zinc dust and caustic soda solution have been employed as well as phenyl hydrazine, aniline, and stannous chloride. Such prior art processes have been discussed in patents relating to the production of various alkyl derivatives of hydroquinone by the catalytic hydrogenation of the corresponding alkyl substituted p-benzoquinones. However, the processes disclosed are not related to those employed in the present invention inasmuch as the substituent on the p-benzoquinone nucleus of the present invention is a phenyl radical.

U. S. Patent 2,090,173 dated August 17, 1937, refers to ethers of phenyl hydroquinone stating that they may be prepared by reducing the phenyl-p-benzoquinone disclosed in U. S. Patent No. 1,735,432 and etherifying the phenyl-hydroquinones so obtained in the usual manner.

Esters of phenyl hydroquinone are also known in the art such as the diacetate described by Yasno Abe, Bull. Chem. Soc. Japan, 18, 93–97 (1943) which was abstracted in Chemical Abstracts 41, 4468d. Of course phenyl hydroquinone itself is an old compound, having been prepared as early as 1900 by Borsche, Ann. 312, 221.

According to the invention, a process is provided for the manufacture of phenyl hydroquinone from phenyl-p-benzoquinone by hydrogenation thereof in a suitable solvent under certain reaction conditions as described below. Moreover, the invention also encompasses the preparation and use of phenyl hydroquinone compositions as antioxidants for fats and oils.

It is an object of our invention to provide a new process for the preparation of phenyl hydroquinone. A further object of the invention is to provide antioxidant compositions for fats and oils comprising phenyl hydroquinone. Other objects will become apparent hereinafter.

According to the invention, phenyl-p-benzoquinone is suspended or dissolved in a suitable solvent. Solvents which can be advantageously employed include the lower aliphatic alcohols such as ethanol, isopropanol, butanol, etc. A hydrogenation catalyst is then added to the solution or suspension in a quantity sufficient to initiate the subsequent hydrogenation reaction under the conditions employed. It has been found that Raney nickel is a hydrogenation catalyst which can be advantageously employed. However, other hydrogenation catalysts include the precious metal catalysts and related catalytic materials prepared therewith, such as palladiumized charcoal, platinized charcoal, platinum oxide, and so on. It is preferable to employ a hydrogenation catalyst which can be readily separated from the reaction mixture upon the completion of the hydrogenation process so as to facilitate the purification of the desired product. The amount of catalyst employed can be as high as 15 to 20 percent or higher based on the weight of the phenyl benzoquinone being hydrogenated. However, much smaller quantities can also be employed as can be readily determined by those familiar with the catalytic hydrogenation of organic compounds.

By way of example of additional solvents or diluents as reaction media besides the lower aliphatic alcohols, there can be mentioned other organic solvents which are inert to the hydrogenation conditions and which include, for example, diethyl ether, other alkyl ethers, toluene, other homologous alkyl derivatives or benzene, etc.

The mixture of phenyl-p-benzoquinone, catalyst and reaction medium is placed in an autoclave and subjected to hydrogen under pressure. The reaction can be advantageously conducted over a wide range of pressure, that is, from about 100 to about 2000 pounds per square inch (p. s. i.). Thus, at a pressure of about 1000 p. s. i. the contents of the autoclave have been brought to a temperature of about 60 to 70° C. with constant stirring whereby it has been discovered that these conditions result in the hydrogenation of phenyl-p-benzoquinone to form phenyl hydroquinone. The completion of the reaction is evidenced by the cessation of hydrogen absorption within a period of several hours. Temperatures lower than 60° C. can be employed without much change in the compound obtained, e. g. 45°–60° C.; however, the time required and the yield obtained are reduced considerably to the extent that the temperature employed is less than 60° C. When temperatures higher than 70° C. are employed, some hydrogenation on the phenolic benzene ring may be brought about. The preferred temperature range for the preparation of phenyl hydroquinone is designated as at about 60° to 70° C. because within this range phenyl benzoquinone can be conveniently hydrogenated in a reasonable time without danger of hydrogenation of either of the two benzene nuclei contained within this compound. However, it is to be understood that the desired hydrogenation can be brought about at temperatures up to about 80°–90° C., the critical limit being at about 90°–95° C. where hydrogenation of the dioxy-substituted benzene ring takes place to a significant extent.

At temperatures in the range of 95 to 105° C., the phenolic benzene nucleus can be hydrogenated completely, whereby phenyl quinitol is prepared. Thus the hydrogenation at 60 to 70° C. under 1000 p. s. i. of hydrogen pressure is carried to completion and the temperature can then be raised to 95 to 105° C. whereupon additional hydrogen will be absorbed by the reaction mixture. Upon the completion of this additional absorption, phenyl quinitol is obtained. In a manner similar to that employed in the preparation of phenyl quinitol, the phenyl nucleus of phenyl quinitol can be hydrogenated completely so as to produce cyclohexyl quinitol. For the accomplishment of this result, the phenyl quinitol in a suitable medium, such as those disclosed above, is hydrogenated at a temperature of 135 to 150° C. under a pressure of about 1000 p. s. i., employing a hydrogenation catalyst. It is obvious that the preparation of cyclohexyl quinitol can be commenced employing either phenyl-p-benzoquinone or phenyl hydroquinone or phenyl quinitol by dissolving or suspending any of these starting materials in a suitable solvent, adding a suitable catalyst, and reacting the resultant mixture with hydrogen under a suitable elevated pressure carrying out each of the temperature range hydrogenation steps that may be necessary.

Regardless of the extent to which the hydrogenation is carried, the desired product can be separated and purified in a completely analogous manner in that it is first filtered from the catalyst after which the solvent can be evaporated and then the crude product distilled at reduced pressure to complete the purification. Redistillation or fractionation can also be employed if further purification is desired.

Phenyl-p-benzoquinone which is employed in accordance with this invention can be obtained very simply and in good yield as described in U. S. Patent 1,735,432 referred to above and also in accordance with the procedure described in the British Intelligence Objective Sub-Committee Final Report No. 1149, page 86, by reaction of diazotized aniline with an aqueous sodium bicarbonate slurry of a benzoquinone. In a similar manner, other closely related compounds which are homologous with phenyl-p-benzoquinone can also be employed. Thus, any of the compounds referred to in this specification may contain on the benzene ring in place of one or more hydrogen atoms, a low molecular weight alkyl radical without markedly influencing the processes employed in the preparation of hydrogenated compounds containing such alkyl radicals or the uses and properties of the resulting products and derivatives thereof. Furthermore, some of the products of this invention may exist as stereoisomers.

The pressure employed in the hydrogenation process is not critical inasmuch as pressure only somewhat above atmospheric pressure can be employed or pressures as high as the apparatus being used can stand without danger of bursting can be employed. The pressure employed does not have a particularly significant effect upon the temperatures described as preferred for the preparation of any of the products described above inasmuch as the degree of pressure has its primary effect in the rate of the reaction and not the manner in which the reaction takes place as regards the product produced. However, the temperature ranges specified herein are to be considered those advantageously effective at a pressure of about 1000 p. s. i. employing wet Raney nickel as the preferred catalyst.

By employing the hydrogenation process described above, excellent yields are obtained with resulting economy of the reacting chemicals. The solvent or reaction media employed can be readily recovered and reused. In a similar manner, the catalyst employed can be recovered and if desired, reactivated and employed again. The apparatus necessary for the conduct of the reaction is simple and readily available commercially. The products obtained require no extensive purification or separation procedures and are readily obtained in a very satisfactory degree of purity. It is quite obvious that these advantages are very worthwhile and represent a marked improvement over the problems and difficulties accompanying hydrogenation employing chemical reducing agents other than the use of hydrogen gas and a catalyst. In addition, the catalytic hydrogenation process described above avoids the formation, removal and disposal of by-products always encountered in reduction through reducing agents other than hydrogen. The following example illustrates further the manner of practicing this phase of our invention:

EXAMPLE 1

Phenyl hydroquinone

The following materials were charged to a stainless steel autoclave: 190 grams of phenyl-p-benzoquinone, 350 cc. of isopropyl alcohol, and 30 grams of wet Raney nickel. This mixture was then subjected to 1000 p. s. i. of hydrogen and heated with stirring to 60 to 70° C. After three hours, the absorption of hydrogen had practically ceased and the mixture was cooled, removed from the autoclave and filtered to remove the catalyst. The isopropyl alcohol was removed by distillation and the remaining crude product was purified further by distillation at a reduced pressure to yield phenyl hydroquinone as a white solid. A yield of 87 percent was obtained (166.5 grams) which had a melting point of 96–101° C. A portion of this product was purified further by recrystallization from ethylene dichloride and its melting point was determined to be 99.5–100.5° C.

Phenyl hydroquinone as prepared in accordance with Example 1 can be employed in the preparation of ethers such as are described in U. S. Patent No. 2,090,173 referred to above. The phenyl hydroquinone ethers can be obtained through the use of the same etherification procedures which apply to phenols in general, for example, phenyl hydroquinone can be reacted with an alkyl halide, an alkyl sulfate, or an alkyl phosphate in the presence of an alkaline reaction medium whereby the acidic compound which is formed is simultaneously neutralized along with the formation of the phenyl hydroquinone ether. Moreover, phenyl hydroquinone can be converted into metallic salts, such as sodium or potassium salts and the salts allowed to react with the appropriate alkyl halide, sulfate, or phosphate according to the well known Williamson ether synthesis. The specific reaction conditions, such as reaction time, temperature, solvent, and so on, are of course dependent upon the properties of the individual ethers. Both mono and di ethers can be formed. In addition to the alkyl ethers referred to, aryl ethers can also be prepared using similar procedures. The ethers obtained are, for the most part, high boiling, unusually stable liquids of value as antioxidants, insecticides, solvents or plasticizers for incorporation in the plastic materials, etc. The aliphatic ethers of phenyl hydroquinone contain two aromatic nuclei susceptible to further reaction, such as nitration, halogenation, sulfonation, etc., and hence this class of ethers represents valuable intermediates in the production of other organic compounds. The aryl ethers of phenyl hydroquinone present similar opportunities for organic synthesis.

In addition to the preparation of phenyl hydroquinone as described in Example 1, this compound can also be prepared employing pressures such as 100 p. s. i. and temperatures such as 80° C. Similarly a pressure of 2000 p. s. i. and a temperature of 45° C. can be employed. More advantageously, pressures of from about 250 to about 1500 p. s. i. and temperatures of from about 50° to about 75° C. can be employed. Other catalysts such as those precious metal catalytic compositions of matter described above can also be employed. Other inert solvents such as benzene, ethyl alcohol, ethyl ether, toluene, etc. can also be advantageously employed.

As has been emphasized above, one of the applicants' primary points of improvement over the prior art resides in the discovery that phenyl-p-benzoquinone can be hydrogenated to obtain excellent yields of phenyl hydroquinone by employing a temperature range no broader than as defined above, and that as a corollary, the undesirable by-products obtained are of remarkably small significance.

What we claim as our invention is:

1. A process for preparing phenyl hydroquinone which comprises reacting phenyl-p-benzoquinone with hydrogen under a pressure of about 1000 pounds per square inch of hydrogen pressure in a closed vessel at a temperature of from about 60° to about 70° C. in the presence of a hydrogenation catalyst selected from the group consisting of nickel and precious metal catalytic compositions of matter and in the presence of an inert diluent selected from the group consisting of the lower aliphatic alcohols and ethers and aromatic compounds of the benzene homologous series.

2. A process as defined in claim 1 wherein the catalyst is Raney nickel.

3. A process as defined in claim 2 wherein the inert diluent is a lower aliphatic alcohol.

4. A process as defined in claim 3 wherein the inert diluent is isopropyl alcohol.

5. A process as defined in claim 4 wherein the pressure and temperature range are maintained until hydrogen absorption has substantially ceased.

6. A process for preparing phenyl hydroquinone which comprises reacting phenyl-p-benzoquinone with hydrogen under a pressure of about 1000 pounds per square inch of hydrogen pressure in a closed vessel with agitation at a temperature range of from about 60° to about 70° C. in the presence of wet Raney nickel as the catalyst and in the presence of isopropyl alcohol and maintaining the reaction conditions until hydrogen absorption has substantially ceased.

References Cited in the file of this patent

UNITED STATES PATENTS

| | | |
|---|---|---|
| 2,090,173 | Zahn et al. | Aug. 17, 1937 |
| 2,229,574 | Jung | Jan. 21, 1941 |